United States Patent
Chaahoub et al.

(10) Patent No.: US 9,048,958 B2
(45) Date of Patent: Jun. 2, 2015

(54) HIGH-SPEED OPTICAL FIBER LINK AND A METHOD FOR COMMUNICATING OPTICAL DATA SIGNALS

(75) Inventors: Faouzi Chaahoub, Cupertino, CA (US); Georgios Asmanis, Lake Forest, CA (US); Samir Aboulhouda, Cupertino, CA (US); Michael A. Robinson, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 378 days.

(21) Appl. No.: 13/460,833

(22) Filed: Apr. 30, 2012

(65) Prior Publication Data
US 2013/0287394 A1    Oct. 31, 2013

(51) Int. Cl.
H04B 10/00    (2013.01)
H04B 10/80    (2013.01)

(52) U.S. Cl.
CPC ..................... *H04B 10/801* (2013.01)

(58) Field of Classification Search
CPC ...................................................... H04B 10/00
USPC .................................................. 398/135–139
See application file for complete search history.

(56) References Cited

U.S. PATENT DOCUMENTS

| | | | |
|---|---|---|---|
| 6,625,241 B2 * | 9/2003 | Mejia | 375/372 |
| 6,665,498 B1 * | 12/2003 | Jiang et al. | 398/135 |
| 6,850,663 B2 * | 2/2005 | Kikuchi et al. | 385/24 |
| 6,932,618 B1 | 8/2005 | Nelson | |
| 6,947,672 B2 * | 9/2005 | Jiang et al. | 398/135 |
| 6,982,879 B1 | 1/2006 | Franca-Neto et al. | |
| 7,050,468 B2 * | 5/2006 | Seto et al. | 370/535 |
| 7,329,054 B1 | 2/2008 | Epitaux et al. | |
| 7,380,993 B2 * | 6/2008 | Dallesasse | 385/89 |
| 7,539,366 B1 | 5/2009 | Baks et al. | |
| 7,729,581 B2 | 6/2010 | Rolston et al. | |
| 7,783,206 B2 | 8/2010 | Reyna et al. | |
| 7,835,648 B2 * | 11/2010 | Hofmeister et al. | 398/136 |
| 7,860,400 B2 * | 12/2010 | Cole | 398/155 |
| 8,047,856 B2 | 11/2011 | McColloch | |
| 8,078,058 B2 * | 12/2011 | Zhang et al. | 398/99 |
| 8,223,768 B2 * | 7/2012 | Handelman | 370/391 |
| 8,340,123 B2 * | 12/2012 | Barbieri et al. | 370/466 |
| 8,382,384 B2 | 2/2013 | Nekado et al. | |
| 8,433,202 B2 * | 4/2013 | Way | 398/158 |

(Continued)

OTHER PUBLICATIONS

Cole, Chris, "MLG (Multi-Link Gearbox) Project Start Proposal, Powerpoint Presentation", *Optical Internetworking Forum*, Fremont, United States Jul. 8, 2011, 1-13.

(Continued)

*Primary Examiner* — Agustin Bello

(57) ABSTRACT

An optical communications system and method at least doubles the data rate of the optical fiber link without requiring a redesign of the backplane ASIC. This is made possible in part through the incorporation of at least one gearbox integrated circuit (IC) is incorporated into the system that is compatible with the current ASIC design. The gearbox IC receives N lanes of electrical data signals from the ASIC, with each electrical data signal having a data rate of X Gbps, and outputs N/2 lanes of electrical data signals, with each electrical data signal having a data rate of 2X Gbps. The high-speed optical transceiver module receives the N/2 electrical data signals output from the gearbox IC and produces N/2 respective optical data signals having a data rate of 2X Gbps for transmission over the optical fiber link.

36 Claims, 6 Drawing Sheets

(56) References Cited

U.S. PATENT DOCUMENTS

| | | | |
|---|---|---|---|
| 8,666,257 B2* | 3/2014 | Daghighian et al. | 398/138 |
| 2003/0053768 A1 | 3/2003 | Brezina et al. | |
| 2004/0028164 A1* | 2/2004 | Jiang et al. | 375/371 |
| 2005/0084269 A1* | 4/2005 | Dallesasse et al. | 398/135 |
| 2005/0156310 A1 | 7/2005 | Benner et al. | |
| 2008/0095541 A1* | 4/2008 | Dallesasse | 398/191 |
| 2008/0107422 A1 | 5/2008 | Cole | |
| 2008/0205437 A1* | 8/2008 | Cole | 370/464 |
| 2008/0240648 A1 | 10/2008 | Im | |
| 2008/0292322 A1* | 11/2008 | Daghighian et al. | 398/192 |
| 2009/0317086 A1 | 12/2009 | Morohashi et al. | |
| 2010/0008679 A1* | 1/2010 | Cole et al. | 398/185 |
| 2010/0021166 A1* | 1/2010 | Way | 398/79 |
| 2010/0266236 A1 | 10/2010 | Meadowcroft et al. | |
| 2010/0272440 A1* | 10/2010 | Haran et al. | 398/67 |
| 2010/0284698 A1 | 11/2010 | McColloch | |
| 2010/0303423 A1 | 12/2010 | McColloch | |
| 2011/0026888 A1 | 2/2011 | Nekado et al. | |
| 2011/0195589 A1 | 8/2011 | Takahashi | |
| 2012/0170927 A1* | 7/2012 | Huang et al. | 398/20 |
| 2013/0259478 A1* | 10/2013 | Komaki | 398/58 |
| 2013/0287394 A1* | 10/2013 | Chaahoub et al. | 398/43 |
| 2014/0010546 A1* | 1/2014 | Chaahoub et al. | 398/116 |

OTHER PUBLICATIONS

Dove, Dan et al., "Next Generation 100 Gigabit Optical Ethernet", *Powerpoint Presentation, IEEE*, San Francisco, United States Jul. 2011 , 1-33.

Gabriel, Steve et al., "Gennum And Altera Demonstrate 4×25Gb/s ICs for Next-Generation 100Gb/s Networks", *Press Release, Altera Corporation*, San Jose, United States Sep. 19, 2011 , 1.

Harpinder, S. Matharu , "100G Dual Gearbox: Improving Port Density On Line Cards In Core Network Equipment", *White Paper. Virtex-7 HT FPGAs*, vol. 1, Xilinx, San Jose, United States Mar. 1, 2012 , 1-10.

Christian Kromer, Gion Sialm, Christoph Berger, Thomas Morf, Martin L. Schmatz, Frank Ellinger, Daniel Erni, Gian-Luca Bona, Heinz Jackel; A 100-mW 4 × 10 Gb/s Transceiver in 80-nm CMOS for High-Density Optical Interconnects; IEEE Journal of Solid-State Circuits; Dec. 2005; 2667-2679; vol. 40 No. 12; IEEE, United States.

"FCI MEG-Array Connectors Perform up to 28Gbps for Next-Generation Pluggable Optical Receivers, Press Release, FCI", Apr. 11, 2012.

Chen Ji, Jingyi Wang et al., "High Volume 850nm Oxide VCSEL Develoment for High Bandwidth Optical Data Link Appications, Article", *Society of Photo-Optical Instrumentation Engineers* 2009 , 1-11, vol. 7229.

\* cited by examiner

HIGH-SPEED OPTICAL FIBER LINK AND A METHOD FOR COMMUNICATING OPTICAL DATA SIGNALS

TECHNICAL FIELD OF THE INVENTION

The invention relates to optical communications networks over which data is communicated in the form of optical signals transmitted and received over optical waveguides. More particularly, the invention relates to a high-speed optical fiber link and a method for communicating optical data signals over a high-speed optical fiber link.

BACKGROUND OF THE INVENTION

In optical communications networks, optical transceiver modules are used to transmit and receive optical signals over optical fibers. An optical transceiver module generates modulated optical signals that represent data, which are then transmitted over an optical fiber coupled to the transceiver module. Each transceiver module includes a transmitter side and a receiver side. On the transmitter side, a laser light source generates laser light and an optical coupling system receives the laser light and optically couples the light onto an end of an optical fiber. The laser light source typically is made up of one or more laser diodes that generate light of a particular wavelength or wavelength range. The optical coupling system typically includes one or more reflective elements, one or more refractive elements and/or one or more diffractive elements. On the receiver side, a photodiode detects an optical data signal transmitted over an optical fiber and converts the optical data signal into an electrical signal, which is then amplified and processed by electrical circuitry of the receiver side to recover the data. The combination of the optical transceiver modules connected on each end of the optical fiber and the optical fiber itself is commonly referred to as an optical fiber link.

In switching systems that are commonly used in optical communications networks, each optical transceiver module is typically mounted on a circuit board that is interconnected with another circuit board that is part of a backplane of the switching system. The backplane typically includes many circuit boards that are electrically interconnected with one another. In many such switching systems, each circuit board of the backplane has an application specific integrated circuit (ASIC) mounted on it and electrically connected to it. Each ASIC is electrically interconnected with a respective optical transceiver module via electrically-conductive traces of the respective circuit boards. In the transmit direction, each ASIC communicates electrical data signals to its respective optical transceiver module, which then converts the electrical data signals into respective optical data signals for transmission over the optical fibers that are connected to the optical transceiver module. In the receive direction, the optical transceiver module receives optical data signals coupled into the module from respective optical fibers connected to the module and converts the respective optical data signals into respective electrical data signals. The electrical data signals are then output from the module and are received at respective inputs of the ASIC, which then processes the electrical data signals. The electrical interconnections on the circuit boards that connect inputs and outputs of each ASIC to outputs and inputs, respectively, of each respective optical transceiver module are typically referred to as lanes.

FIG. 1 illustrates a block diagram of a known optical communications system 2 of a known switching system. The optical communications system 2 comprises a first circuit board 3, an optical transceiver module 4 mounted on the first circuit board 3, a backplane circuit board 5, and an ASIC 6 mounted on the backplane circuit board 5. Four output optical fibers 7 and four input optical fibers 8 are connected to the optical transceiver module 4. In the transmit direction, the ASIC 6 produces four 10 gigabit per second (Gbps) electrical data signals, which are output from the ASIC 6 onto four respective output lanes 9 to the optical transceiver module 4. The optical transceiver module 4 then converts the four 10 Gbps electrical data signals into four respective 10 Gbps optical data signals and couples them into the ends of four respective optical fibers 7 for transmission over the optical fiber link. In the receive direction, four 10 Gbps optical data signals are coupled from the ends of four respective optical fibers 8 into the optical transceiver module 4, which then converts the optical data signals into four 10 Gbps electrical data signals. The four 10 Gbps electrical data signals are then output over four respective input lanes 11 to four respective inputs of the ASIC 6 for processing by the ASIC 6. Thus, the optical fiber link has a data rate of 40 Gbps in the transmit direction and 40 Gbps in the receive direction. The data rate of the optical fiber link can be increased by increasing the number of optical transceiver modules 4 and ASICs 6 that are included in the link. For example, if four optical transceiver modules 4 and four ASICs 6 are included in the optical communications system 2, the optical fiber link will have a data rate of 160 Gbps in the transmit direction and 160 Gbps in the receive direction.

Ever-increasing demands for greater bandwidth often lead to efforts to upgrade optical fiber links to achieve higher data rates. Doing so, however, typically requires either duplicating the number of optical transceiver modules and ASICs that are used in the optical communications system or replacing the optical transceiver modules and ASICs with optical transceivers and ASICs that operate at higher data rates. Of course, duplicating the number of optical transceiver modules and ASICs that are used in the optical communications system is a very costly solution. Therefore, it would be desirable to provide a way to substantially increase the bandwidth of an optical fiber link without having to duplicate the number of optical transceiver modules and ASICs that are employed in the optical communications system. In order to replace the ASICs with ASICs that operate at higher data rates, the ASIC would have to be redesigned, which is also a very costly solution.

Accordingly, it would be desirable to provide a way to upgrade an optical fiber link to achieve substantially higher data rates without having to duplicate the number of optical transceiver modules and ASICs that are employed in the optical communications system and without having to redesign the ASIC.

SUMMARY OF THE INVENTION

The invention is directed to an optical communications system for use in a high-speed optical fiber link and a method for communicating optical data signals at high speeds over an optical fiber link. The optical communications system comprises an ASIC, a first gearbox integrated circuit (IC), and an optical transceiver module. The ASIC outputs N electrical data signals having a data rate of X Gbps from a first set of output terminals of the ASIC, where N is a positive integer that is equal to or greater than 2 and where X is a positive number that is equal to or greater than 1. The first gearbox inputs the N electrical data signals that are output from the first set of output terminals of the ASIC to the first gearbox IC via a first set of input terminals of the first gearbox IC and converts the N electrical data signals into N/2 electrical data signals having a data rate of 2X Gbps. The gearbox IC outputs the N/2 electrical data signals from a first from a first set of output terminals of the gearbox IC. The optical transceiver module has a transceiver controller, N/2 laser diodes, N/2 laser diode drivers, N/2 photodiodes, N/2 amplifiers, and an optics system. WEnds of a plurality of optical fibers of the optical fiber link are coupled to the optical transceiver module. The optical transceiver module receives the N/2 electrical data signals output from the first set of output terminals of the first gearbox IC and causes the laser diode drivers to modulate the respective laser diodes in accordance with the respective N/2 electrical data signals received in the optical transceiver module to cause N/2 optical data signals having a data rate of 2X Gbps to be produced. AThe optics system couples the respective N/2 optical data signals into respective ends of respective optical fibers of the plurality of optical fibers.

The method comprises: coupling ends of a plurality of optical fibers of the optical fiber link to an optical transceiver module of an optical communications system, with an ASIC of the optical communications system, outputting N electrical data signals having a data rate of X Gbps from a first set of output terminals of the ASIC, where X is greater than or equal to 1; with a first gearbox IC of the optical communications system, inputting the N electrical data signals that are output from the first set of output terminals of the ASIC to the first gearbox IC via a first set of input terminals of the gearbox IC; in the first gearbox IC, converting the N electrical data signals into N/2 electrical data signals having a data rate of 2X Gbps and outputting the N/2 electrical data signals from a first set of output terminals of the first gearbox IC; in the optical transceiver module, receiving the N/2 electrical data signals outputted from the first set of output terminals of the first gearbox IC and causing N/2 laser diode drivers of the optical transceiver module to modulate the N/2 respective laser diodes in accordance with the respective N/2 electrical data signals received in the optical transceiver module to cause N/2 optical data signals having a data rate of 2X Gbps to be produced; and with an optics system of the optical transceiver module, coupling the respective N/2 optical data signals into the ends of respective optical fibers of the plurality of optical fibers.

These and other features and advantages of the invention will become apparent from the following description, drawings and claims.

DETAILED DESCRIPTION OF AN ILLUSTRATIVE EMBODIMENT

Figure 1:
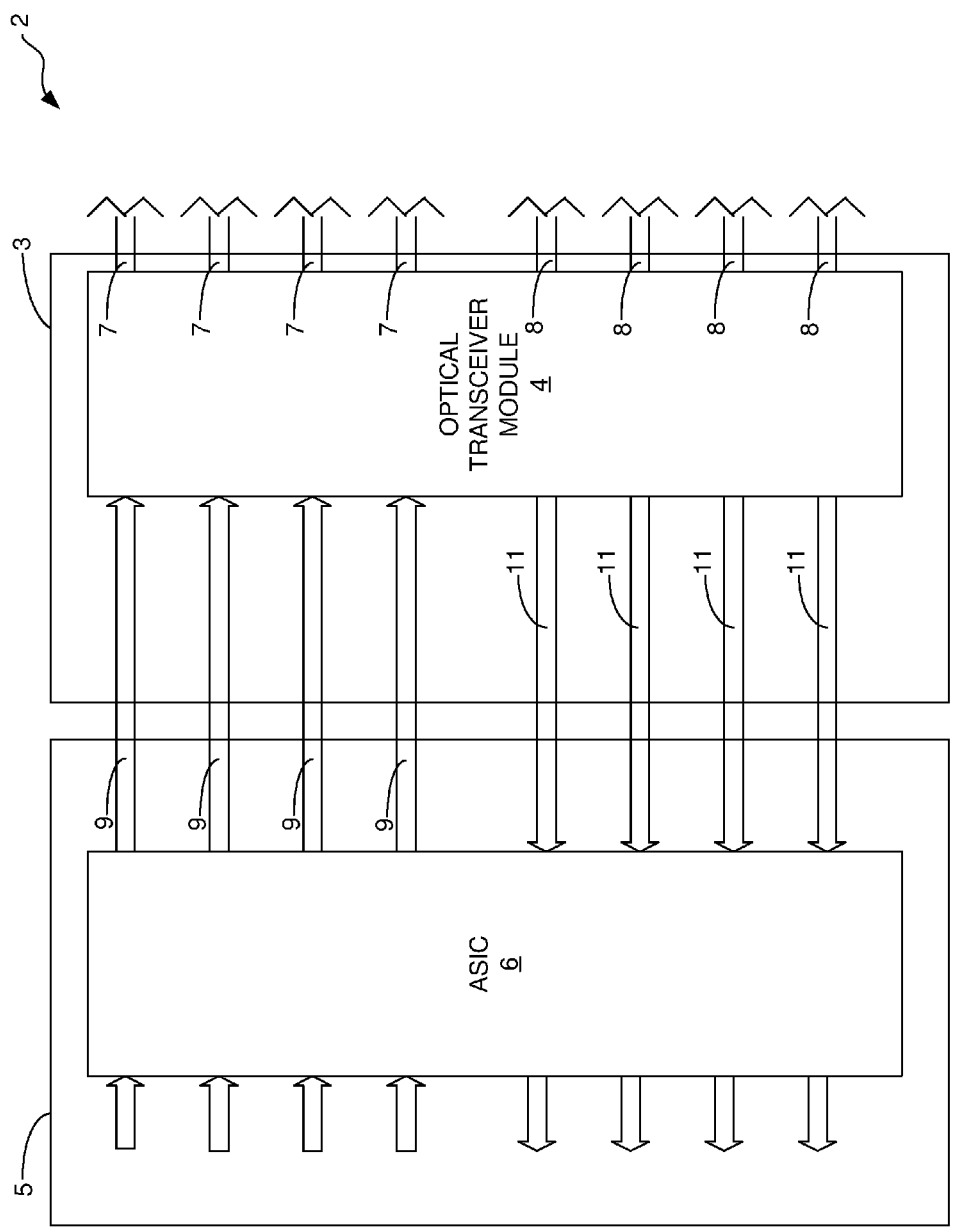
FIG. 1 illustrates a block diagram of a known optical communications system of a known switching system.

In accordance with the invention, a high-speed optical fiber link is provided that at least doubles the data rate of the aforementioned known optical fiber link without requiring a redesign of the ASIC that is currently used in the optical fiber link. This is made possible in part through the incorporation of at least one gearbox integrated circuit (IC) into the optical communications system that is compatible with the current ASIC design. The gearbox IC is configured to interface with multiple ASICs of the current ASIC design and to interface with a high-speed optical transceiver module. In the transmit direction, the gearbox IC receives N lanes of electrical data signals from the ASICs, with each electrical data signal having a data rate of X Gbps, and outputs N/2 lanes of electrical data signals, with each electrical data signal having a data rate of 2X Gbps, where N is a positive integer that is equal to or greater than 2 and X is a positive number that is equal to or greater than 1. The high-speed optical transceiver module receives the N/2 electrical data signals output from the gearbox IC, produces N/2 respective optical data signals and outputs the optical data signals onto N/2 optical fibers, with each optical data signal having a data rate of 2X. In the receive direction, the high-speed optical transceiver module receives N/2 optical data signals over N/2 optical fibers and converts them into N/2 respective electrical data signals, each having a data rate of 2X Gbps. The N/2 electrical data signals are then received over N/2 lanes at respective inputs of the gearbox IC, which converts the N/2 electrical data signals into N electrical data signals, each having a data rate of X. The gearbox IC then outputs the N electrical data signals onto N lanes for delivery to respective inputs of the ASICs. The ASICs then process the electrical data signals in the normal manner.

For example, if the total number of data lanes that are output from all of the ASICs is equal to four (i.e., N=4), with each electrical data signal having a data rate of 10.3125 Gbps (i.e., X=10), then the gearbox IC will output two lanes of electrical data signals, with each electrical data signal having a data rate of 20.625 Gbps. As is typical in the optical communications industry, a data rate of 10.3125 Gbps will be referred to herein as simply 10 Gbps and the data rate of 20.625 Gbps will be referred to herein simply as 20 Gbps. The high-speed optical transceiver module converts each electrical data signal into an optical data signal at the same data rate as the electrical data signal and outputs the optical data signal onto an optical fiber. In the receive direction, the optical transceiver module receives two optical data signals, each having a data rate of 20 Gbps, and converts them into two electrical data signals, each having a data rate of 20 Gbps. The optical data signals are the delivered over two lanes to the gearbox IC, which converts them into four electrical data signals, each having a data rate of 10 Gbps. The four 10 Gbps electrical data signals are then delivered over four respective lanes to the ASICs, which process the electrical data signals in the normal manner. Thus, incorporation of the gearbox IC into the optical communications system allows ASICs of an existing design to be used with a high-speed optical transceiver module to achieve a data rate for the optical fiber link that is at least double the previous data rate of the link. These and other features and advantages of the invention will now be described with reference to the illustrative, or exemplary, embodiments shown in FIGS. 2-6, in which like reference numerals represent like elements or features.

Figure 2:
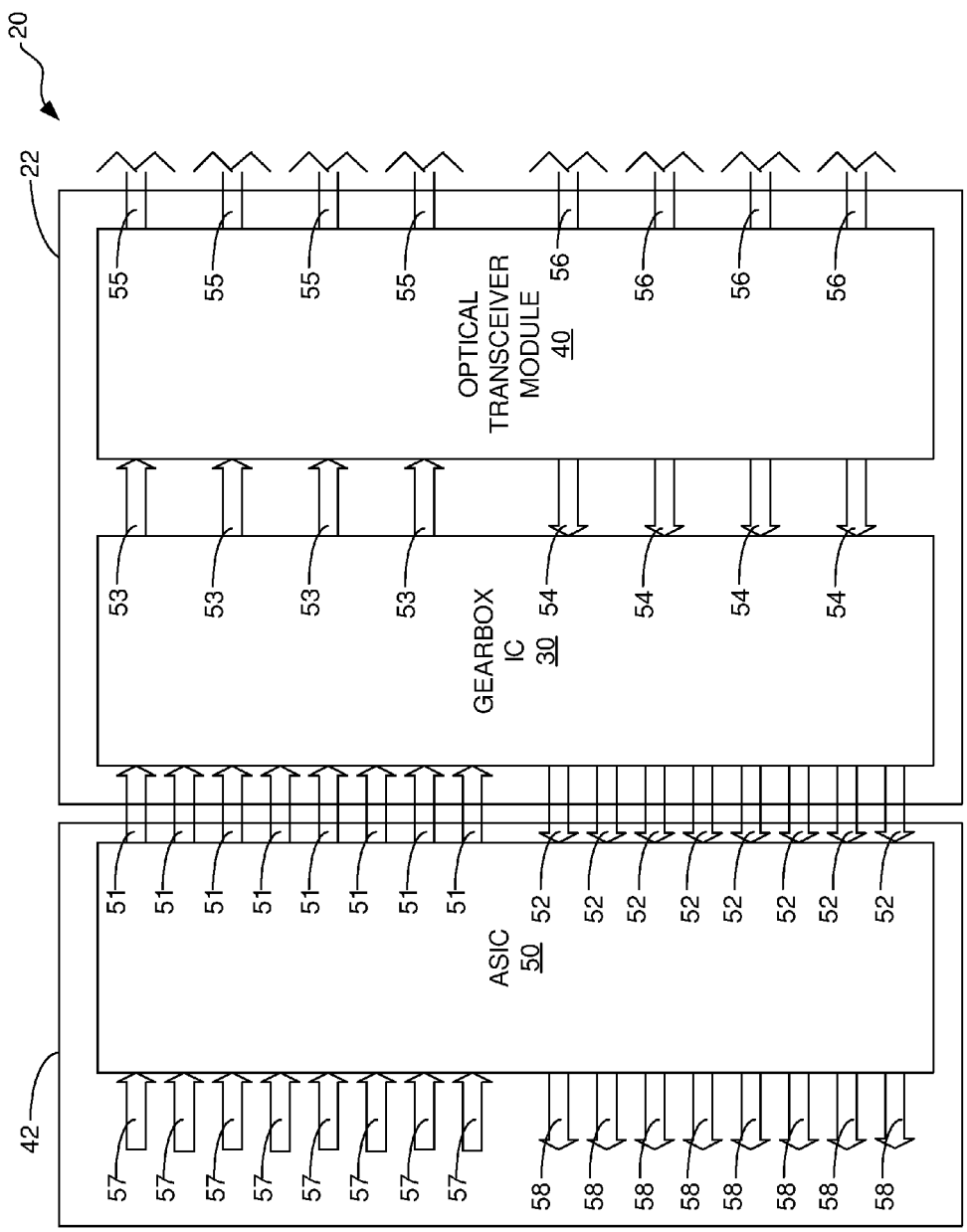
FIG. 2 illustrates a block diagram of an optical communications system located on one end of the high-speed optical fiber link in accordance with one illustrative, or exemplary, embodiment of the invention.

FIG. 2 illustrates a block diagram of an optical communications system 20 located on one end of the high-speed optical fiber link in accordance with one illustrative, or exemplary, embodiment of the invention. The optical communications system 20 comprises a first circuit board 22, a gearbox IC 30 mounted on the first circuit board 22, a high-speed optical transceiver module 40 mounted on the first circuit board 22, a backplane circuit board 42, and one or more ASICs 50 mounted on the backplane circuit board 42. In accordance with this illustrative embodiment, the one or more ASICs 50 corresponds to two of the ASICs 6 shown in FIG. 1, although the one or more ASICs 50 could be a single ASIC. For ease of illustration, the one or more ASICs 50 are represented as a single block in the block diagram of FIG. 2. It should also be noted that although two separate circuit boards 22 and 42 are shown in FIG. 2, the gearbox IC 30, the high-speed optical transceiver module 40 and the ASIC 50 could be mounted on a single circuit board, such as circuit board 22.

In accordance with the illustrative embodiment shown in FIG. 2, N=8 and X=10 Gbps. Therefore, there are eight output lanes 51 interconnecting the ASIC 50 and the gearbox IC 30 and eight input lanes 52 interconnecting the ASIC 50 and the gearbox IC 30. There are four output lanes 53 interconnecting the gearbox IC 30 and the optical transceiver module 40 and four input lanes 54 interconnecting the optical transceiver module 40 and the gearbox IC 30. There are four output optical fibers 55 and four input optical fibers 56 optically and mechanically coupled to the optical transceiver module 40. In the transmit direction, eight 10 Gbps electrical data signals are output on the output lanes 51 from the ASIC 50 to the gearbox IC 30. The gearbox IC converts the eight 10 Gbps electrical data signals into four 20 Gbps electrical data signals and outputs the four 20 Gbps electrical data signals onto output lanes 53 to the optical transceiver module 40. The optical transceiver module 40 converts each 20 Gbps electrical data signal into a 20 Gbps optical data signal and outputs the optical data signals onto output optical fibers 55. In the receive direction, the optical transceiver module 40 receives four 20 Gbps optical data signals output from the ends of the four input optical fibers 56 and converts them into four 20 Gbps electrical data signals. The four 20 Gbps optical data signals are then delivered over the four input lanes 54 to the gearbox IC 30, which converts the four 20 Gbps electrical data signals into eight 10 Gbps electrical data signals. The eight 10 Gbps electrical data signals are then delivered over the eight input lanes 52 to the ASIC 50, which processes the 10 Gbps electrical data signals in the known manner in which the ASIC 6 shown in FIG. 1 processes 10 Gbps electrical data signals.

On the backplane side of the ASIC 50, there are typically eight 10 Gbps input lanes 57 and eight 10 Gbps output lanes 58 for communicating with other ASICs 50 and/or other gearbox ICs 30 of other optical communications systems that are identical to optical communications system 20 and located either within the same switching system or in other switching systems. Furthermore, another instance of the gearbox IC 30 may be added to the backplane side to double the data rate of the electrical data signals that are communicated between ASICs 50 of the backplane, as will now be described with reference to FIG. 3.

Figure 3:
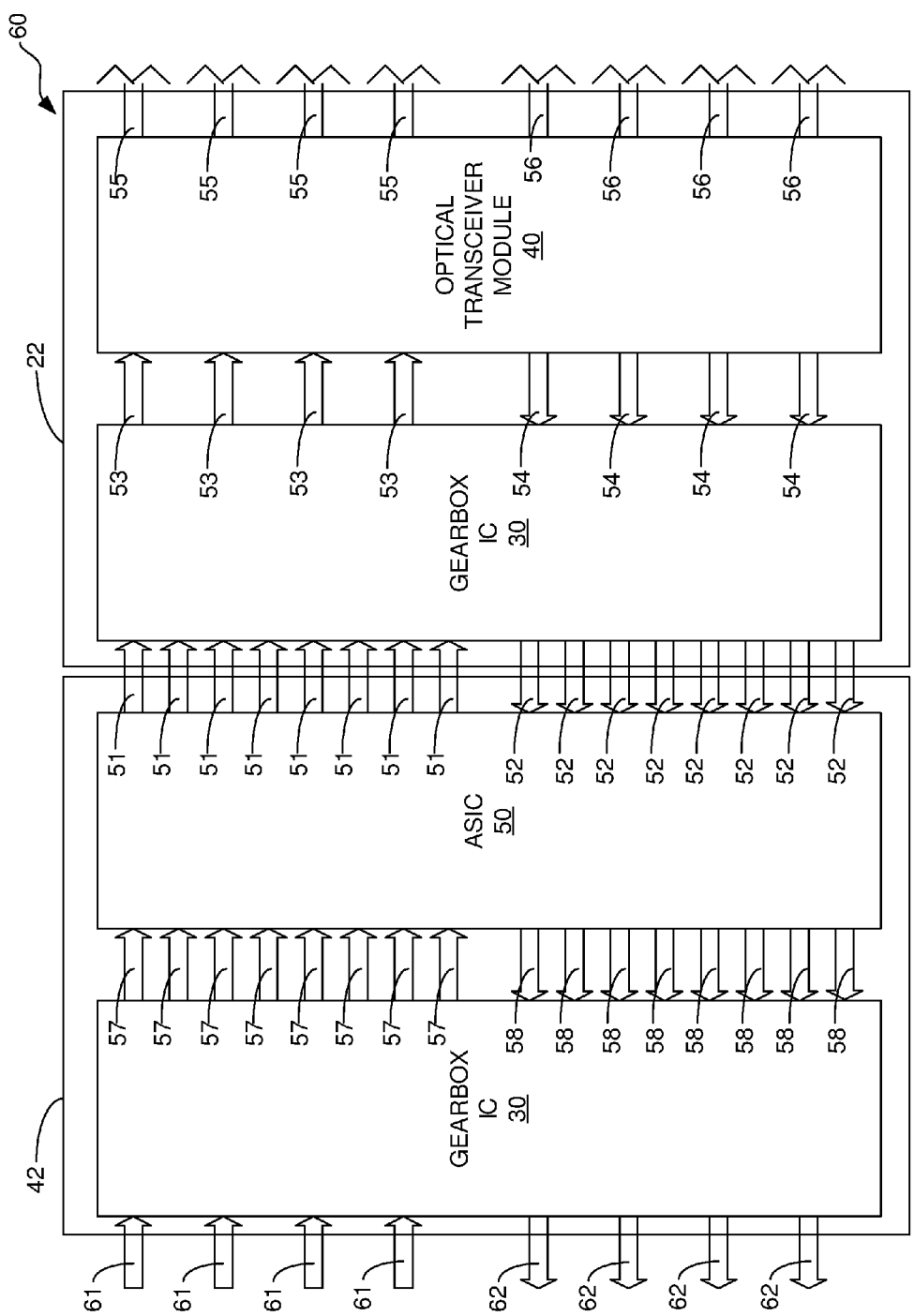
FIG. 3 illustrates a block diagram of an optical communications system that is identical to the optical communications system shown in FIG. 2 except that the optical communications system includes a second gearbox IC that is interconnected with the ASIC on the backplane side of the system.

FIG. 3 illustrates a block diagram of an optical communications system 60 that is identical to the optical communications system 20 shown in FIG. 2 except that the optical communications system 60 includes a second gearbox IC 30 that is interconnected with the ASIC 50 on the backplane side of the system 60. The second gearbox IC 30 receives four 20 Gbps electrical data signals over four input lanes 61 and outputs four 20 Gbps electrical data signals over four output lanes 62. The four 20 Gbps electrical data signals that are received in the gearbox IC 30 over input lanes 61 are output from an identical gearbox IC 30 of an identical optical communication system 60 located elsewhere in the same switching system. Similarly, the four 20 Gbps electrical data signals that are output from the gearbox IC 30 over output lanes 62 are input to an identical gearbox IC 30 of an identical optical communication system 60 located elsewhere in the same switching system. In this way, the gearbox ICs 30 allow ASICs 50 of the same switching system or of different, but similarly configured, switching systems to communicate with one another at the higher data rate of 20 Gbps instead of 10 Gbps.

Figure 4:
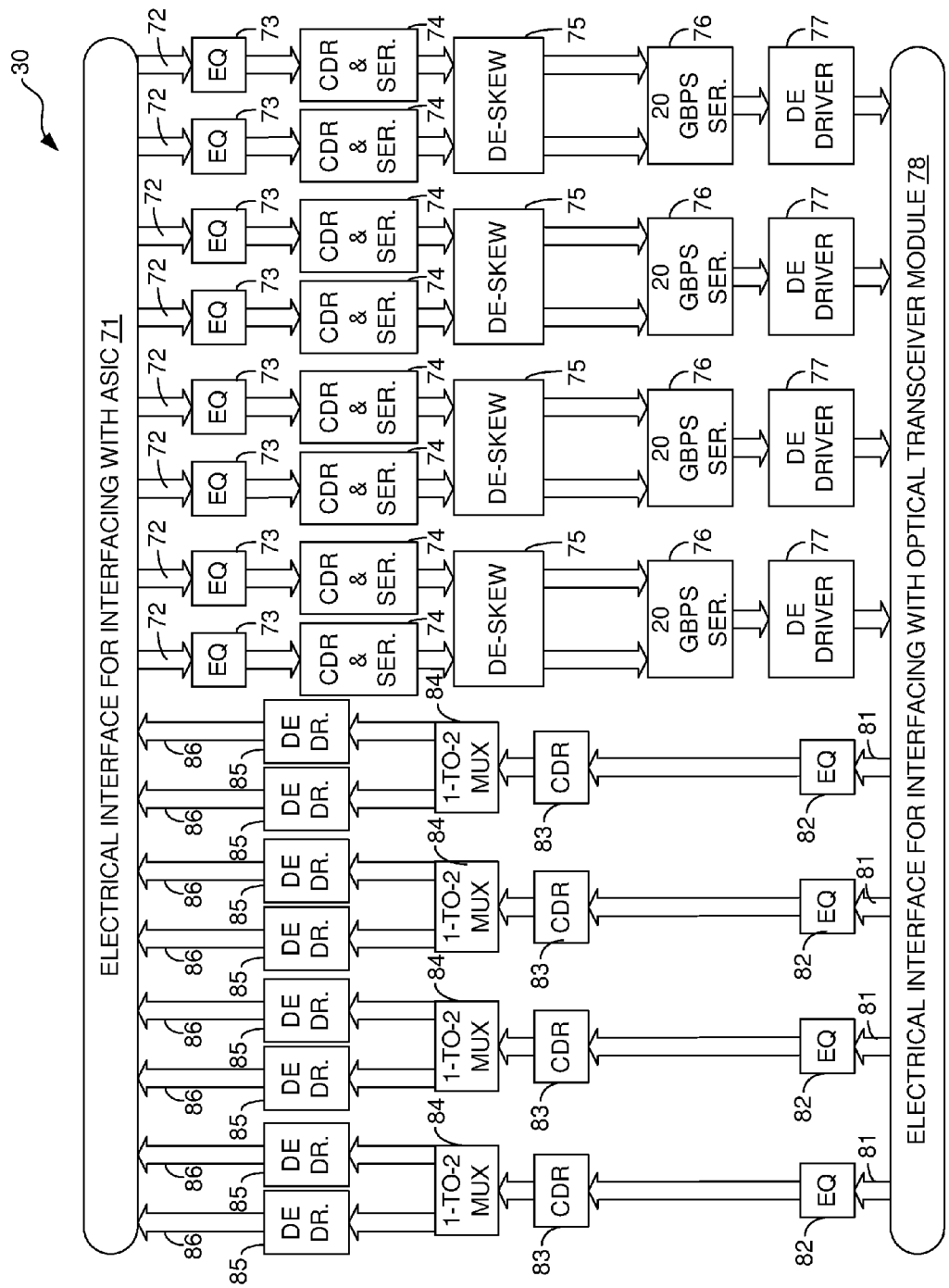
FIG. 4 illustrates a block diagram of the gearbox IC shown in FIG. 2 in accordance with an illustrative embodiment.

FIG. 4 illustrates a block diagram of the gearbox IC 30 shown in FIG. 2 in accordance with an illustrative embodiment. In the illustrative embodiments described above with reference to FIGS. 2 and 3, the gearbox IC 30 has been described in terms of simply performing rate conversion, but to accomplish the rate conversion, the gearbox IC 30 performs additional operations, such as, for example, clock and data recovery (CDR), bit alignment, serialization, and demultiplexing. The components of the gearbox IC 30 and the operations they perform will now be described with reference to FIG. 4.

An electrical interface 71 interfaces the gearbox IC 30 with the ASIC 50. The electrical interface 71 may be, for example, an XLAUI interface, which is a well-known interface for interfacing ICs. For the incoming 10 Gbps electrical data signals received over lanes 51 from the ASIC 50, four pairs of lanes 72 that are internal to the gearbox IC 30 provide the electrical data signals to respective equalizers 73. The equalizers 73 restore the respective electrical data signals to their original waveforms and output each pair of the restored electrical data signals to respective CDR and deserializer components 74. The CDR and deserializer components 74 perform clock and data recovery and deserialization on each of the electrical data signals of the respective pairs and output the resulting pairs of electrical data signals to respective de-skew components 75. The de-skew components 75 performs static and dynamic phase alignment on the respective pairs of electrical data signals and provide the pairs of phase-aligned electrical data signals to respective 20 Gbps serializer components 76.

The 20 Gbps serializer components 76 perform serialization on the two phase-aligned electrical data signals of the respective pairs to produce respective 20 Gbps electrical data signals. The four 20 Gbps electrical data signals are then delivered to respective de-emphasis (DE) drivers 77, which de-emphasize and amplify the respective 20 Gbps electrical data signals and deliver the respective 20 Gbps electrical data signals to electrical interface 78. The electrical interface 78 is a physical layer/media access layer device (PMD) configured to interface the gearbox IC 30 with the optical transceiver module 40 (FIG. 2). The resulting 20 Gbps electrical data signals are then delivered to the optical transceiver module 40, which converts them into 20 Gbps optical data signals and couples the optical data signals onto respective optical fibers 55 (FIG. 2). Embodiments of the optical transceiver module 40 will be described below detail with reference to FIGS. 5 and 6.

In the receive direction, the electrical interface 78 receives four 20 Gbps electrical data signals from the optical transceiver module 40 (FIG. 2) and delivers them via respective internal lanes 81 to respective equalizers 82. The equalizers 82 perform equalization on the respective 20 Gbps electrical data signals and deliver the equalized electrical data signals to respective CDR components 83. The CDR components 83 perform clock and data recovery algorithms on the respective electrical data signals and deliver pairs of the respective 20

Gbps electrical data signals to respective 1-to-2 multiplexers (MUXes) 84. Each of the MUXes 84 converts a respective 20 Gbps electrical data signal into a pair of 10 Gbps electrical data signals, which are then delivered to respective DE drivers 85. The DE drivers 85 de-emphasize and amplify the respective 10 Gbps electrical data signals and output the respective 10 Gbps electrical electrical data signals onto internal lanes 86 for delivery to the electrical interface 71. The electrical interface 71 then outputs the eight 10 Gbps electrical data signals over lanes 52 (FIG. 2) to the ASIC 50 (FIG. 4).

It should be noted that many modifications may be made to the gearbox IC 30 shown in FIG. 2 while still allowing the gearbox IC 30 to perform the tasks described above of converting pairs of 10 Gbps electrical data signals into 20 Gbps electrical data signals, and vice versa. For example, the equalizers 73 and 82 and the de-emphasis drivers 77 and 85 are optional in many cases depending on the trace lengths that carry the corresponding electrical data signals and the strength or integrity of the corresponding electrical data signals. It should also be noted that other variations may be made to the gearbox IC 30, such as replacing certain components that perform certain functions with other components that perform similar or equivalent functions. Persons of skill in the art will understand the manner in which such modifications can be made to the gearbox IC 30 while still allowing it to perform the functions described above with reference to FIGS. 2-4.

Figure 5:
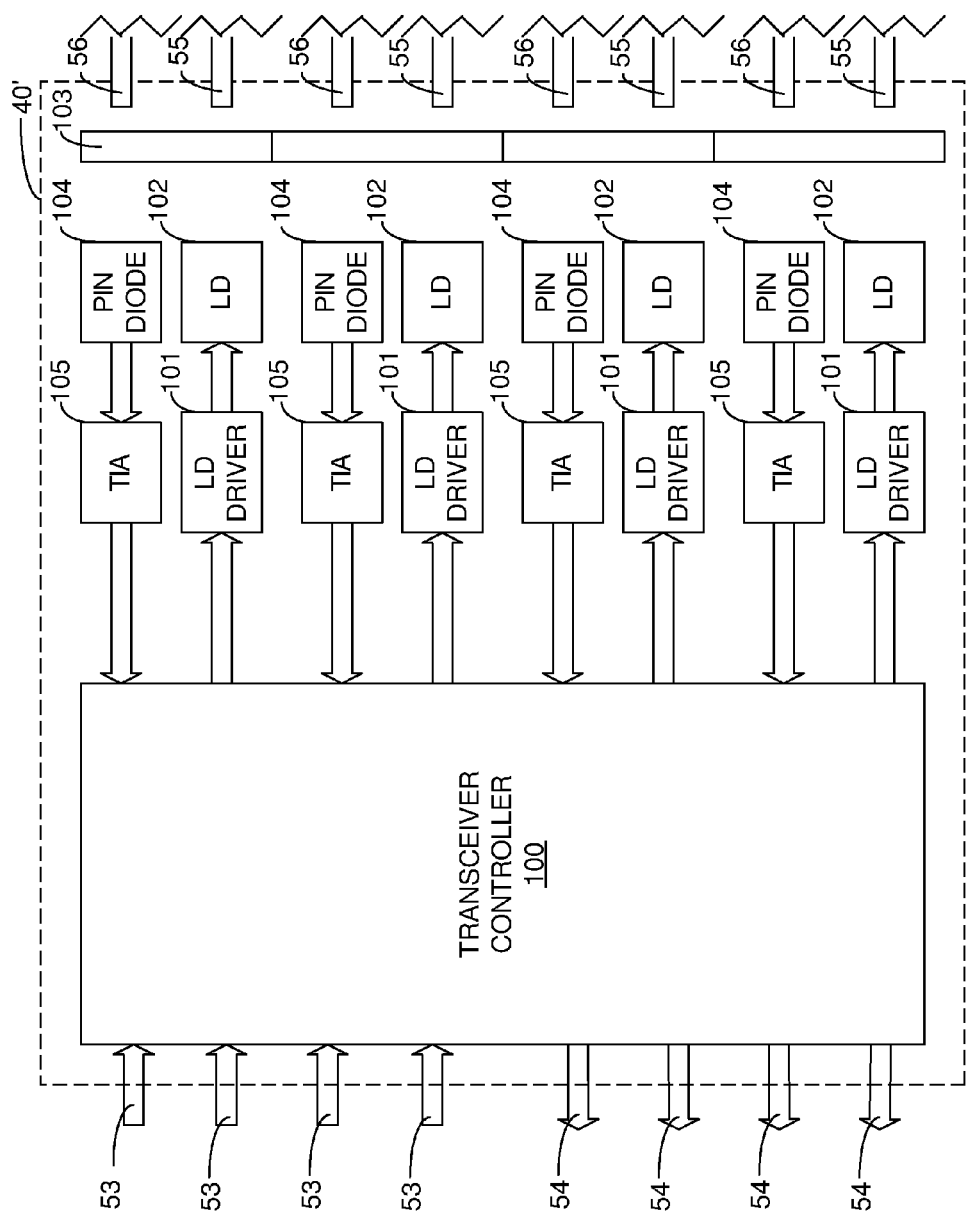
FIG. 5 illustrates a block diagram of the high-speed optical transceiver module shown in FIGS. 2 and 3 in accordance with an illustrative embodiment.

FIG. 5 illustrates a block diagram of the high-speed optical transceiver module 40 shown in FIGS. 2 and 3 in accordance with an illustrative embodiment. The optical transceiver module 40 in accordance with this illustrative embodiment will be referred to herein as optical transceiver module 40'. Four 20 Gbps electrical data signals output from the gearbox IC 30 (FIGS. 2-4) are delivered via lanes 53 to a transceiver controller 100 of the optical transceiver module 40'. The transceiver controller 100 includes a programmable control device (not shown) such as a microcontroller or microprocessor, for example, as well as other electrical circuitry (not shown) for processing the electrical data signals received in the controller 100 via lanes 53 and for processing electrical data signals to be output from the controller onto lanes 54. In the transmit direction, the four 20 Gbps electrical data signals received in the controller 100 on lanes 53 are processed and then delivered to the laser diode (LD) drivers 101. The LD drivers 101 modulate the respective LDs 102 in accordance with the respective 20 Gbps electrical data signals to produce respective 20 Gbps optical data signals. The four 20 Gbps optical data signals produced by the four LDs 102 are then coupled by an optics system 103 into the ends of four respective optical fibers 55 for transmission over the optical fiber link.

In the receive direction, four 20 Gbps optical data signals are output from the ends of four respective optical fibers 56 and are coupled by the optics system 103 onto four photodiodes 104, which convert the optical data signals into respective electrical current signals. The photodiodes 104 may be, for example, p-intrinsic-n (PIN) diodes. The respective electrical current signals are then output to respective trans-impedance amplifiers (TIAs) 105, which convert the electrical current signals into respective 20 Gbps electrical voltage signals. The four 20 Gbps electrical voltage signals are then processed by electrical circuitry (not shown) of the transceiver controller 100, such as a CDR circuitry, to recover the data contained in the electrical voltage signals to produce four 20 Gbps electrical data signals. The four 20 Gbps electrical data signals are then output on lanes 54 for delivery to the gearbox IC 30.

The LDs 102 are not limited to being any particular types of LDs. In accordance with the illustrative embodiment, the LDs 102 are vertical cavity surface emitting laser diodes (VCSELs). The VCSELs that are used for this purpose may operate at data rates of 16 Gbps and still allow the data rate of the optical data signals that are transmitted over the fibers 55 to be 20 Gbps. This is made possible in large part through the pre-conditioning and post-conditioning of the electrical data signals in the gearbox IC 30 and/or in the electrical circuitry of the transceiver controller 100. Of course, VCSELs that operate at even higher data rates, e.g., 20 Gbps, are also suitable for this purpose, but such VCSELs currently may not be widely available.

The optics system 103 may be any type of suitable optics system such as, for example, a refractive or diffractive optics system comprising one or more refractive or diffractive optical elements, respectively. As will be understood by those of skill in the art, a variety of optical elements exist or can readily be designed and manufactured for this purpose. In the illustrative embodiment shown in FIG. 5, a separate optical fiber 55 and 56 is used for each LD 102 and photodiode 104, respectively. As will now be described with reference to FIG. 6, a single optical fiber may be used with each pair of LDs 102 and photodiodes 104 to provide a bidirectional optical fiber link.

Figure 6:
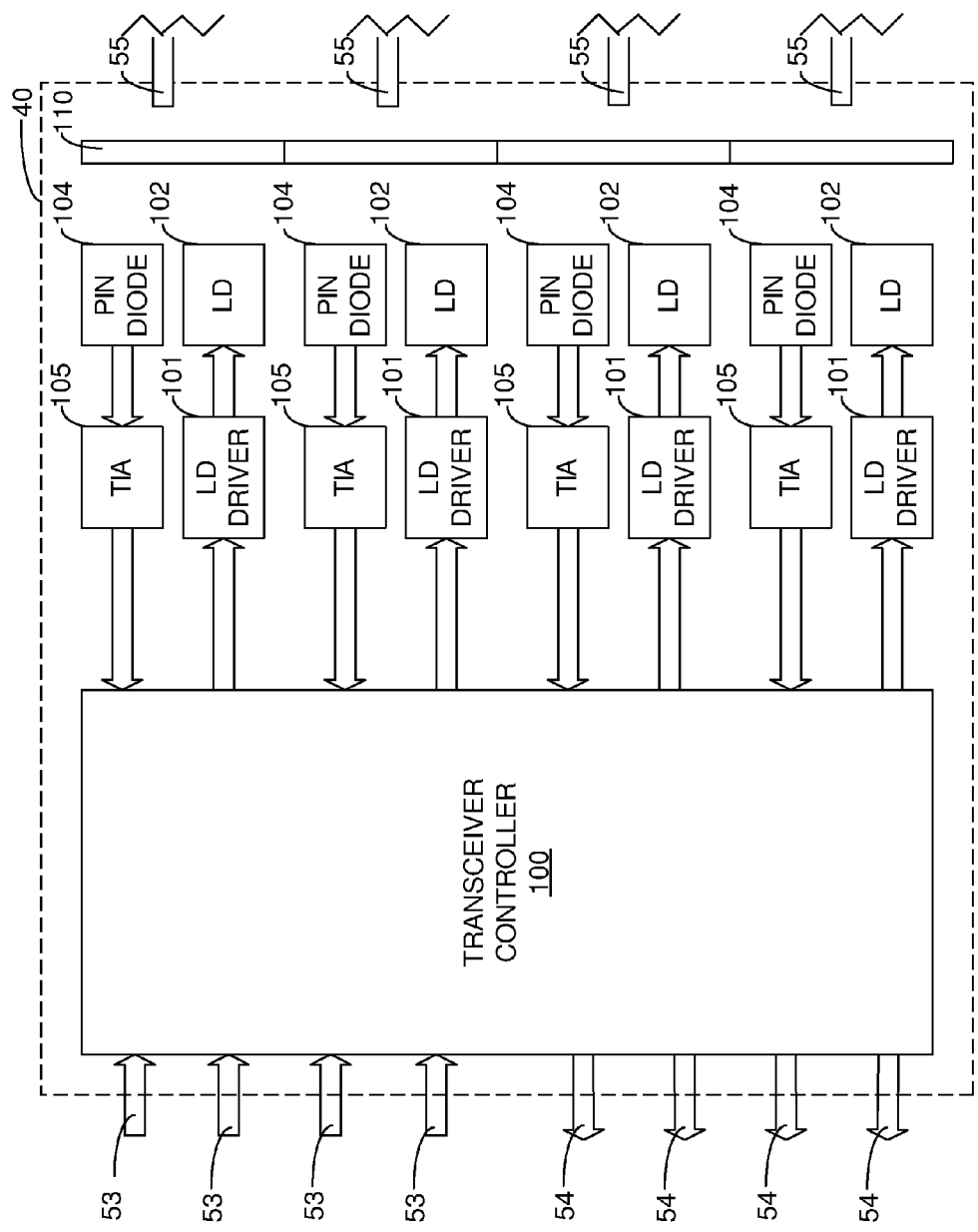
FIG. 6 illustrates a block diagram of the high-speed optical transceiver module shown in FIGS. 2 and 3 in accordance with another illustrative embodiment.

FIG. 6 illustrates a block diagram of the high-speed optical transceiver module 40 shown in FIGS. 2 and 3 in accordance with another illustrative embodiment. The optical transceiver module 40 in accordance with this illustrative embodiment will be referred to herein as optical transceiver module 40". The optical transceiver module 40" is identical to the optical transceiver module 40' shown in FIG. 5 except that the optical transceiver module 40" has an optics system 110 that is different from the optics system 103 shown in FIG. 5, as will be described below in detail. Also, for reasons that will be described below in connection with the optics system 110, the optical transceiver module 40" is connected to only N/2 optical fibers 55 instead of the eight optical fibers 55 and 56 shown in FIG. 5. In accordance with this illustrative embodiment, N=8, and therefore there are a total of four optical fibers 55. Each of the four optical fibers 55 acts as both a transmit optical fiber for transmitting optical data signals over the optical fiber link and as a receive optical fiber for receiving optical data signals over the optical fiber link. Therefore, these optical fibers 55 will be referred to herein as transmit/receive optical fibers. Like reference numerals in FIGS. 5 and 6 represent like elements or components.

In the transmit direction, four 20 Gbps electrical data signals output from the gearbox IC 30 (FIGS. 2-4) are delivered via lanes 53 to the transceiver controller 100 of the optical transceiver module 40". As stated above, the transceiver controller 100 includes a programmable control device (not shown) such as a microcontroller or microprocessor, for example, as well as other electrical circuitry (not shown) for pre-processing of the electrical data signals that are received in the controller 100 via lanes 53 and for post-processing of the electrical data signals that are to be output from the controller 100 onto lanes 54. The four 20 Gbps electrical data signals received in the controller 100 on lanes 53 are processed and then delivered to the LD drivers 101. The LD drivers 101 modulate the respective LDs 102 in accordance with the respective 20 Gbps electrical data signals received thereby to produce respective 20 Gbps optical data signals. The four 20 Gbps optical data signals produced by the four LDs 102 are then coupled by the optics system 110 into the ends of four respective transmit/receive optical fibers 55 for transmission over the optical fiber link.

In the receive direction, four 20 Gbps optical data signals are output from the ends of the four respective transmit/receive optical fibers 55 and are coupled onto the four respective PIN diodes 104, which convert the optical data signals into respective electrical current signals. The respective electrical current signals are then output to the respective TIAs 105, which convert the electrical current signals into respective 20 Gbps electrical voltage signals. The four 20 Gbps electrical voltage signals are then processed by electrical circuitry (not shown) of the transceiver controller 100, such as a CDR circuitry, to recover the data contained in the electrical voltage signals to produce four 20 Gbps electrical data signals. The four 20 Gbps electrical data signals are then output on lanes 54 for delivery to the gearbox IC 30.

In accordance with the illustrative embodiment shown in FIG. 6, the optics system 110 performs optical MUXing and DeMUXing operations to allow optical data signals to be simultaneously transmitted and received over optical fibers 55 such that full optical duplexing is achieved over the optical fiber link. In other words, optical data signals are simultaneously transmitted and received on each of the optical fibers 55 at a data rate of at least 20 Gbps in each direction. Therefore, the optical fiber link is capable of simultaneously transmitting optical data signals at a data rate of 80 Gbps and receiving optical data signals at a data rate of 80 Gbps to provide an aggregate data rate for the optical fiber link of 160 Gbps using only four optical fibers 55. The manner in which such a full-duplex optical fiber link can be provided is disclosed in U.S. patent application Ser. No. 12/495,707, filed on Jun. 30, 2009, entitled "A HIGH-SPEED OPTICAL TRANSCEIVER, A BI-DIRECTIONAL DUPLEX OPTICAL FIBER LINK, AND A METHOD FOR PROVIDING A BI-DIRECTIONAL DUPLEX OPTICAL FIBER LINK," which has been published as U.S. Publ. Appl. No. 2010/0329669, and which is incorporated by reference herein in its entirety. Therefore, in the interest of brevity, the optics system 110 and the optical MUXing and deMUXing operations performed thereby will not be described herein in further detail.

The above description of FIGS. 2-6 has demonstrated illustrative embodiments of the invention that enable the data rate of an optical fiber link to be substantially increased (e.g., doubled) without having to redesign the ASICs that are used in the backplanes of the link. In the illustrative embodiments described above, a 20 Gbps optical transceiver module is used in conjunction with an ASIC that inputs and outputs 10 Gbps electrical data signals and with a gearbox IC that converts 10 Gbps electrical data signals into 20 Gbps electrical data signals, and vice versa, to upgrade an optical fiber link to have at least double its previous bandwidth. By avoiding the need to redesign the ASICs that are used in the backplane, a substantial cost savings is realized while still achieving the much higher bandwidth of the upgraded optical fiber link. It should be noted that while the embodiments of the invention have been described with respect to upgrading an optical fiber link, the invention applies equally to building a new optical fiber link that uses the optical communications systems 20 or 60 described above with reference to FIGS. 2 and 3, respectively.

It should be noted that the invention has been described with reference to a few illustrative embodiments for the purpose of demonstrating the principles and concepts of the invention. The invention is not limited to the embodiments described herein, as will be understood by those of ordinary skill in the art in view of the description provided herein. Many modifications may be made to the embodiments described herein without deviating from the goals or objectives of the invention, and all such modifications are within the scope of the invention.

What is claimed is:

1. An optical communications system for use in an optical fiber link, the optical communications system comprising:
    an application specific integrated circuit (ASIC), the ASIC outputting N electrical data signals having a data rate of X gigabits per second (Gbps) from a first set of output terminals of the ASIC, where N is a positive integer that is equal to or greater than 2 and where X is a positive number that is equal to or greater than 1;
    a first gearbox integrated circuit (IC), the first gearbox IC inputting the N electrical data signals that are output from the first set of output terminals of the ASIC via a first set of input terminals of the gearbox IC and converting the N electrical data signals into N/2 electrical data signals having a data rate of 2X Gbps, the gearbox IC outputting the N/2 electrical data signals from a first set of output terminals of the first gearbox IC; and
    an optical transceiver module having a transceiver controller, N/2 laser diodes, N/2 laser diode drivers, N/2 photodiodes, N/2 amplifiers, and an optics system, wherein ends of a plurality of optical fibers of the optical fiber link are coupled to the optical transceiver module, the optical transceiver module receiving the N/2 electrical data signals output from the first set of output terminals of the first gearbox IC and causing the laser diode drivers to modulate the respective laser diodes in accordance with the respective N/2 electrical data signals received in the optical transceiver module to cause N/2 optical data signals having a data rate of 2X Gbps to be produced, and wherein the respective N/2 optical data signals are coupled by the optical communications system into respective ends of respective optical fibers of the plurality of optical fibers.

2. The optical communications system of claim 1, wherein N/2 optical data signals having a data rate of 2X pass out of the ends of respective optical fibers of the plurality of optical fibers and are coupled by the optical communications system onto respective photodiodes of the N/2 photodiodes, the respective photodiodes converting the N/2 optical data signals into N/2 electrical current signals, respectively, the N/2 amplifiers converting the N/2 electrical current signals into N/2 respective output electrical data signals having a data rate of 2X Gbps, the N/2 output electrical data signals being output from respective output terminals of the optical transceiver module and being inputted to the first gearbox IC via a second set of input terminals of the first gearbox IC, and wherein the first gearbox IC converts the N/2 electrical data signals input to the first gearbox IC via the second set of input terminals of the first gearbox IC into N electrical data signals having a data rate of 2X Gbps, the first gearbox IC outputting the N electrical data signals having the data rate of 2X Gbps via a second set of output terminals of the first gearbox IC, and wherein the N electrical data signals output from the second set of output terminals of the first gearbox IC are input to the ASIC via a first set of N input terminals of the ASIC.

3. The optical communications system of claim 1, wherein the ASIC has a second set of N input terminals for receiving N electrical data signals from a backplane of the optical fiber link.

4. The optical communications system of claim 2, wherein the ASIC has a second set of N output terminals for outputting N electrical data signals to a backplane of the optical fiber link.

5. The optical communications system of claim 1, wherein X is approximately equal to 10.

6. The optical communications system of claim 5, wherein N is equal to 8.

7. The optical communications system of claim 2, wherein the first gearbox IC comprises:
- N clock and data recovery (CDR) and deserializer components, each CDR and deserializer component performing CDR and deserialization on one of the respective N electrical data signals input to the first set of input terminals of the gearbox IC, each CDR and deserializer component outputting an electrical data signal from an output terminal of the respective CDR and deserializer component;
- N/2 de-skew components, each de-skew component receiving a pair of the electrical data signals that are output from two of the CDR and deserializer components at first and second input terminals of the de-skew component, each de-skew component performing static and dynamic phase alignment on the pair of electrical data signals received thereby and outputting a pair of electrical data signals from first and second output terminals of the de-skew components; and
- N/2 serializer components, each of the N/2 serializer components receiving one of the pairs of electrical data signals output from the first and second output terminals of one of the de-skew components, each of the N/2 serializer components performing a serializer operation on the pair of electrical data signals received thereby to produce a serial electrical data signal having a data rate of 2X Gbps, each serial electrical data signal being output from an output terminal of the respective serializer components, and wherein each of said N/2 electrical data signals output from the first set of output terminals of the gearbox IC corresponds to one of the serial electrical data signals.

8. The optical communications system of claim 7, wherein the first gearbox IC further comprises:
- N/2 de-emphasis drivers, each of the N/2 de-emphasis drivers receiving a respective one of the serial electrical data signals output from the output terminal of a respective one of the N/2 serializer components de-emphasizing and driving the respective serial electrical data signal to produce said N/2 electrical data signals output from the first set of output terminals of the first gearbox IC.

9. The optical communications system of claim 8, wherein the first gearbox IC further comprises:
- N equalizers, each of the N equalizers equalizing one of the respective N electrical data signals input to the first set of input terminals of the gearbox IC prior to the respective one of the N electrical data signals input being input to a respective one of the CDR and serializer components.

10. The optical communications system of claim 7, wherein the first gearbox IC further comprises:
- N/2 1-to-2 multiplexers (MUXes), each of the MUXes receiving, at an input terminal of the MUX, one of said N/2 electrical data signals input to the gearbox IC via the second set of input terminals of the gearbox IC and converting a respective one of the N/2 electrical data signals into two of the N electrical data signals having the data rate of 2X Gbps, each of the MUXes outputting the two electrical data signals having the data rate of 2X Gbps from first and second output terminals of the respective MUX.

11. The optical communications system of claim 10, wherein the first gearbox IC further comprises:
- N de-emphasis drivers, each of the N de-emphasis drivers receiving one of the two electrical data signals output from one of the output terminals of a respective one of the MUXes and de-emphasizing and driving the respective electrical data signal received thereby to produce one of said N electrical data signals output from the second set of output terminals of the gearbox IC.

12. The optical communications system of claim 7, wherein the first gearbox IC further comprises:
- N/2 CDR components, each of the N/2 CDR components having an output terminal that is coupled to the input terminal of one of the N/2 MUXes, each of the N/2 CDR components performing clock and data recovery on a respective one of said N/2 electrical data signals input to the gearbox IC via the second set of input terminals of the gearbox IC and outputting the respective one of the N/2 electrical data signals from an output terminal thereof to the input terminal of the respective one of the N/2 MUXes.

13. The optical communications system of claim 12, wherein the first gearbox IC further comprises:
- N/2 equalizers, each of the N/2 equalizers having an output terminal that is coupled to the input terminal of one of the N/2 CDR components, each of the N/2 equalizers equalizing a respective one of said N/2 electrical data signals input to the gearbox IC via the second set of input terminals of the gearbox IC and outputting the respective one of the equalized N/2 electrical data signals from an output terminal thereof to the input terminal of the respective one of the N/2 CDR components.

14. The optical communications system of claim 1, further comprising:
- a second gearbox IC, wherein the ASIC has a second set of N output terminals for outputting N electrical data signals having a data rate of 2X Gbps to a first set of N input terminals of the second gearbox IC, and wherein the N electrical data signals that are outputted from the second set of output terminals of the ASIC are inputted to the second gearbox IC via a first set of input terminals of the second gearbox IC, and wherein the second gearbox IC converts the N electrical data signals inputted to the second gearbox IC into N/2 electrical data signals having a data rate of 2X Gbps, and wherein the second gearbox IC outputs the N/2 electrical data signals from the second gearbox IC via a first set of output terminals of the second gearbox IC.

15. The optical communications system of claim 14, wherein N/2 electrical data signals have a data rate of 2X Gbps are inputted into the second gearbox IC via a second set of input terminals of the second gearbox IC, and wherein the second gearbox IC converts the N/2 electrical data signals inputted to the second gearbox IC into N electrical data signals having a data rate of X Gbps, and wherein the second gearbox IC outputs the N electrical data signals from the second gearbox IC via a second set of output terminals of the second gearbox IC, and wherein the N electrical data signals that are output from the second gearbox IC via the second set of output terminals of the second gearbox IC are inputted to the ASIC via a set of input terminals of the ASIC.

16. The optical communications system of claim 2, wherein said plurality of optical fibers of the optical fiber link comprises N/2 transmit optical fibers and N/2 receive optical fibers, and wherein the N/2 optical data signals that are coupled by the optical communications system into respective ends of respective optical fibers are coupled into respective ends of respective transmit optical fibers of said N/2 transmit optical fibers, and wherein the N/2 optical data signals that pass out of the ends of respective optical fibers pass out of the ends of respective receive optical fibers of said N/2 receive optical fibers.

17. The optical communications system of claim 2, wherein said plurality of optical fibers of the optical fiber link comprises N/2 transmit/receive optical fibers, each of the N/2 transmit/receive optical fibers acting as both a transmit optical fiber for transmitting optical data signals and as a receive optical fiber for receiving optical data signals, and wherein the N/2 optical data signals that are coupled by the optical communications system into respective ends of respective optical fibers are coupled into respective ends of respective transmit/receive optical fibers of said N/2 transmit/receive optical fibers, and wherein the N/2 optical data signals that pass out of the ends of respective optical fibers pass out of respective transmit/receive optical fibers of said N/2 transmit/receive optical fibers.

18. A method for communicating optical data signals over an optical fiber link, the method comprising:
   providing an optical transceiver module, the optical transceiver module having ends of a plurality of optical fibers of the optical fiber link coupled there to, the optical transceiver module having a transceiver controller, N/2 laser diodes, N/2 laser diode drivers, N/2 photodiodes, N/2 amplifiers, and an optics system, where N is a positive integer that is equal to or greater than 2;
   with an application specific integrated circuit (ASIC) of the optical communications system, outputting N electrical data signals having a data rate of X gigabits per second (Gbps) from a first set of output terminals of the ASIC, where X is greater than or equal to 1;
   with a first gearbox integrated circuit (IC) of the optical communications system, inputting the N electrical data signals that are output from the first set of output terminals of the ASIC to the gearbox IC via a first set of input terminals of the gearbox IC;
   in the first gearbox IC, converting the N electrical data signals into N/2 electrical data signals having a data rate of 2X Gbps and outputting the N/2 electrical data signals from a first set of output terminals of the first gearbox IC;
   in the optical transceiver module, receiving the N/2 electrical data signals outputted from the first set of output terminals of the first gearbox IC and causing N/2 laser diode drivers of the optical transceiver module to modulate the N/2 respective laser diodes in accordance with the respective N/2 electrical data signals received in the optical transceiver module to cause N/2 optical data signals having a data rate of 2X Gbps to be produced; and
   coupling the respective N/2 optical data signals into the ends of respective optical fibers of the plurality of optical fibers.

19. The method of claim 18, further comprising:
   receiving N/2 optical data signals having a data rate of 2X passing out of the ends of respective optical fibers of the plurality of optical fibers and optically coupling the N/2 optical data signals onto N/2 respective photodiodes of the optical transceiver module, the respective photodiodes converting the N/2 optical data signals into N/2 electrical current signals, respectively, and wherein N/2 amplifiers of the optical transceiver module convert the N/2 electrical current signals into N/2 respective output electrical data signals having a data rate of 2X Gbps;
   outputting the N/2 output electrical data signals from respective output terminals of the optical transceiver module;
   inputting the N/2 output electrical data signals via a second set of input terminals of the first gearbox IC to the first gearbox IC;
   in the first gearbox IC, converting the N/2 electrical data signals input to the first gearbox IC via the second set of input terminals of the first gearbox IC into N electrical data signals having a data rate of 2X Gbps;
   outputting the N electrical data signals having the data rate of 2X Gbps from the first gearbox IC via a second set of output terminals of the first gearbox IC; and
   inputting the N electrical data signals output from the second set of output terminals of the first gearbox IC to the ASIC via a first set of N input terminals of the ASIC.

20. The method of claim 18, further comprising:
   in the ASIC, receiving N electrical data signals from a backplane of the optical fiber link via a second set of N input terminals of the ASIC.

21. The method of claim 19, further comprising:
   outputting N electrical data signals to a backplane of the optical fiber link via a second set of N output terminals of the ASIC.

22. The method of claim 18, wherein X is approximately equal to 10.

23. The method of claim 22, wherein N is equal to 8.

24. The method of claim 18, further comprising:
   with N clock and data recovery (CDR) and deserializer components of the first gearbox IC, performing CDR and deserialization on one of the respective N electrical data signals input to the first set of input terminals of the first gearbox IC; and
   outputting an electrical data signal from an output terminal of the respective CDR and deserializer component;
   in each of N/2 de-skew components of the first gearbox IC, receiving a pair of the electrical data signals that are output from two of the CDR and deserializer components at first and second input terminals of the de-skew component;
   in each de-skew component, performing static and dynamic phase alignment on the pair of electrical data signals received thereby and outputting a pair of electrical data signals from first and second output terminals of the de-skew components;
   in each of N/2 serializer components of the first gearbox IC, receiving one of the pairs of electrical data signals output from the first and second output terminals of one of the de-skew components and performing a serializer operation on the pair of electrical data signals received thereby to produce a serial electrical data signal having a data rate of 2X Gbps; and
   outputting each serial electrical data signal being output from an output terminal of the respective serializer components, and wherein each of said N/2 electrical data signals output from the first set of output terminals of the gearbox IC corresponds to one of the serial electrical data signals.

25. The method of claim further comprising:
   in N/2 de-emphasis drivers of the first gearbox IC, receiving a respective one of the serial electrical data signals output from the output terminal of a respective one of the N/2 serializer components de-emphasizing and driving the respective serial electrical data signal to produce said N/2 electrical data signals output from the first set of output terminals of the gearbox IC.

26. The method of claim 25, further comprising:
   with N equalizers of the first gearbox IC, equalizing one of the respective N electrical data signals input to the first set of input terminals of the first gearbox IC prior to the respective one of the N electrical data signals input being input to a respective one of the CDR and serializer components.

27. The method of claim 24, further comprising:
in each of N/2 1-to-2 multiplexers (MUXes) of the first gearbox IC, receiving, at an input terminal of the MUX, one of said N/2 electrical data signals input to the first gearbox IC via the second set of input terminals of the first gearbox IC and converting a respective one of the N/2 electrical data signals into two of the N electrical data signals having the data rate of 2X Gbps; and
from each MUX, outputting two electrical data signals having the data rate of 2X Gbps from first and second output terminals of the respective MUX.

28. The method of claim 27, further comprising:
in each of N de-emphasis drivers of the first gearbox IC, receiving one of the two electrical data signals output from one of the output terminals of a respective one of the MUXes and de-emphasizing and driving the respective electrical data signal received thereby to produce one of said N electrical data signals output from the second set of output terminals of the gearbox IC.

29. The method of claim 24, further comprising:
in each of N/2 CDR components of the first gearbox IC, performing clock and data recovery on a respective one of said N/2 electrical data signals input to the first gearbox IC via the second set of input terminals of the first gearbox IC and outputting the respective one of the N/2 electrical data signals from an output terminal thereof to the input terminal of the respective one of the N/2 MUXes.

30. The method of claim 29, further comprising:
in each of N/2 equalizers of the first gearbox IC, equalizing a respective one of said N/2 electrical data signals input to the gearbox IC via the second set of input terminals of the gearbox IC and outputting the respective one of the equalized N/2 electrical data signals from an output terminal thereof to the input terminal of the respective one of the N/2 CDR components.

31. The method of claim 18, further comprising:
outputting N electrical data signals having a data rate of 2X Gbps from a second set of N output terminals of the ASIC;
inputting the N electrical data signals outputted from the second set of N output terminals of the ASIC to a second gearbox IC via a first set of input terminals of the second gearbox IC;
in the second gearbox IC, converting the N electrical data signals inputted to the second gearbox IC into N/2 electrical data signals having a data rate of 2X Gbps; and
outputting the N/2 electrical data signals from the second gearbox IC via a first set of output terminals of the second gearbox IC.

32. method of claim 31, further comprising:
inputting N/2 electrical data signals having a data rate of 2X Gbps into the second gearbox IC via a second set of input terminals of the second gearbox IC;
in the second gearbox IC, converting the N/2 electrical data signals inputted to the second gearbox IC into N electrical data signals having a data rate of X Gbps;
outputting the N electrical data signals from the second gearbox IC via a second set of output terminals of the second gearbox IC; and
inputting the N electrical data signals that are output from the second gearbox IC via the second set of output terminals of the second gearbox IC to the ASIC via a set of input terminals of the ASIC.

33. The method of claim 18, wherein said plurality of optical fibers of the optical fiber link comprises N/2 transmit optical fibers and N/2 receive optical fibers, and wherein the step of coupling the respective N/2 optical data signals into the ends of respective optical fibers comprises coupling the N/2 optical data signals into ends of respective transmit optical fibers of said N/2 transmit optical fibers, and wherein the step of receiving N/2 optical data signals passing out of the ends of respective optical fibers comprises receiving N/2 optical data signals passing out of ends of respective receive optical fibers of said N/2 receive optical fibers.

34. The method of claim 18, wherein said plurality of optical fibers of the optical fiber link comprises N/2 transmit/receive optical fibers, each of the N/2 transmit/receive optical fibers acting as both a transmit optical fiber for transmitting optical data signals and as a receive optical fiber for receiving optical data signals, and wherein the step of coupling the respective N/2 optical data signals into the ends of respective optical fibers comprises coupling the N/2 optical data signals into ends of respective transmit/receive optical fibers of said N/2 transmit/receive optical fibers, and wherein the step of receiving N/2 optical data signals passing out of the ends of respective optical fibers comprises receiving N/2 optical data signals passing out of ends of respective transmit/receive optical fibers of said N/2 transmit/receive optical fibers.

35. An optical communications system for use in an optical fiber link, the optical communications system comprising:
a first integrated circuit (IC), the first IC outputting N electrical data signals having a first data rate from a first set of output terminals of the first IC, where N is a positive integer that is equal to or greater than 2 and where the first data rate is X gigabits per second (Gbps), X being a positive number that is equal to or greater than one;
a second IC, the second IC inputting the N electrical data signals that are output from the first set of output terminals of the first IC via a first set of input terminals of the second IC and converting the N electrical data signals into M electrical data signals having a second data rate that is at least 2X Gbps, where M is equal to N/2, the second IC outputting the M electrical data signals from a first set of output terminals of the second IC; and
an optical transceiver module, wherein ends of a plurality of optical fibers of the optical fiber link are coupled to the optical transceiver module, the optical transceiver module receiving the M electrical data signals output from the first set of output terminals of the second IC and causing M respective laser diodes to be driven in accordance with the respective M electrical data signals received in the optical transceiver module to cause M optical data signals having the second data rate to be produced, and wherein the optical communications system couples the respective M optical data signals into respective ends of respective optical fibers of the plurality of optical fibers.

36. A method for communicating optical data signals over an optical fiber link, the method comprising:
coupling ends of a plurality of optical fibers of the optical fiber link to an optical transceiver module of an optical communications system;
with a first integrated circuit (IC) of the optical communications system, outputting N electrical data signals having a first data rate from a first set of output terminals of the first IC, where N is a positive integer that is greater than or equal to 2 and where the first data rate is X gigabits per second (Gbps), X being a positive number that is equal to or greater that one;
with a second IC of the optical communications system, inputting the N electrical data signals that are output from the first set of output terminals of the first IC to the second IC via a first set of input terminals of the second IC;

in the second IC, converting the N electrical data signals into M electrical data signals having a second data rate that is at least 2X Gpbs and outputting the M electrical data signals from a first set of output terminals of the second IC, where M is equal to N/2;

in the optical transceiver module, receiving the M electrical data signals outputted from the first set of output terminals of the second IC and causing M light sources of the optical transceiver module to be modulated in accordance with the respective M electrical data signals received in the optical transceiver module to cause M optical data signals having the second data rate to be produced; and in the optical communication system, coupling the respective M optical data signals into the ends of respective optical fibers of the plurality of optical fibers.

* * * * *